United States Patent Office 3,454,607
Patented July 8, 1969

3,454,607
HIGH MOLECULAR WEIGHT CARBOXYLIC COMPOSITIONS
William M. Le Suer, Cleveland, and George R. Norman, Lyndhurst, Ohio, assignors to The Lubrizol Corporation, Wickliffe, Ohio, a corporation of Ohio
No Drawing. Continuation of application Ser No. 523,261, Jan. 27, 1966. This application Feb. 10, 1969, Ser. No. 800,820
Int. Cl. C08f 27/00
U.S. Cl. 260—408                                    12 Claims

ABSTRACT OF THE DISCLOSURE

A process for preparing a high molecular weight carboxylic composition comprises the reaction of a hydrocarbon halide having a molecular weight of at least about 100 with an unsaturated carboxylic compound such as acrylic acid. The process is useful for the preparation of products useful as additives in lubricants, fuels, plastics, etc.

---

The present application is a continuation of application Ser. No. 523,261, filed Jan. 27, 1966, now abandoned, which is a continuation-in-part of application Ser. No. 468,948, filed July 1, 1965, now U.S. 3,341,542, which is a division of application Ser. No. 126,809, filed July 21, 1961, now U.S. 3,219,666.

This invention relates to high molecular weight carboxylic compounds and a method of preparing the same. Carboxylic compounds such as acids, esters, halides, and amides are useful in a wide variety of applications. Those which have relatively high molecular weights are useful particularly in organic compositions such as resins, plastics, paints, greases, herbicides, insecticides, fuels, lubricants, etc. A great deal of interest exists in such compounds and methods by which such compounds can be prepared.

Accordingly it is an object of this invention to provide relatively high molecular weight carboxylic compounds.

It is another object of this invention to provide a method of preparing relatively high molecular weight carboxylic compounds.

These and other objects are attained by providing a process for preparing high molecular weight carboxylic compounds which comprises reacting a halogenated aliphatic hydrocarbon, preferably a halogenated olefin polymer, having a molecular weight of at least about 100 with an alpha-beta-unsaturated monocarboxylic acid-producing compound.

The halogenated olefin polymers useful in the above process include principally chlorinated or brominated olefin polymer. Iodinated olefin polymers likewise are useful. The halogenated olefin polymers are preferably derived from polymers of alkenes such as mono-olefins having from 2 to 30 carbon atoms, particularly the homopolymers and interpolymers of 1-mono-olefins having from 2 to 5 carbon atoms, such as ethylene, propene, 1-butene, isobutene, 1-hexene, 1-octene, 2-methyl-1-heptene, 3-cyclohexyl-1-butene and 2-methyl-5-propyl-1-hexene. They may be derived from polymers of medial olefins, i.e., olefins in which the olefinic linkage is not at the terminal position, such as 2-butene, 3-pentene and 4-octene. Those derived from polymers of lower 1-mono-olefins, i.e., having less than about 6 carbon atoms, are especially useful.

Interpolymers of the above illustrated olefins with other interpolymerizable unsaturated substances such as aromatic olefins, cyclic olefins and polyenes are also useful to form the halogenated olefin polymers of the above process. Such interpolymers include, for example, those prepared by polymerizing isobutene with styrene; isobutene with butadiene; propene with isoprene; ethylene with piperylene; isobutene with chloroprene; isobutene with p-methylstyrene; 1-hexene with 1,3-hexadiene; 1-octene with 1-hexene; 1-heptene and 1-pentene; 3-methyl-1-butene with 1-octene; 3,3-dimethyl-1-pentene with 1-hexene; isobutene with styrene and piperlyene, etc.

The relative proportions of the mono-olefins to the other polymerizable monomers in the interpolymers should be such that the interpolymers are substantially aliphatic and substantially saturated, i.e., they should contain at least about 80 percent, preferably at least about 95 percent, on a weight basis of units derived from the aliphatic mono-olefins and no more than about 5 percent of olefinic linkages based on the total number of carbon-to-carbon covalent linkages.

Specific examples of such interpolymers include the copolymer of 95 percent (by weight) of isobutene with 5 percent of styrene; the terpolymer of 98 percent of isobutene with 1 percent of piperylene and 1 percent of chloroprene; the terpolymer of 95 percent of isobutene with 2 percent of 1-butene and 3 percent of 1-hexene; the terpolymer of 60 percent of isobutene with 20 percent of 1-pentene and 20 percent of 1-octene; the copolymer of 80 percent of 1-hexene and 20 percent of 1-heptene; the terpolymer of 90 percent of isobutene with 2 percent of cyclohexene and 8 percent of propene; and the copolymer of 80 percent of ethylene and 20 percent of propene.

Polymers of butene, particurarly isobutene, are preferred. Such polymers are conveniently obtained by polymerzing a butene such as isobutene by the use of a Friedel-Crafts polymerization catalyst such as aluminum chloride, boron trifluoride, titanium tetrachloride or the like. When commercial isobutene is used in the polymerization, the polymer may contain a small amount of polymerized units of 1-butene or 2-butene which often is present in the commercial isobutene. For the purposes of this invention, a polyisobutene may thus contain small proportions of polymerized or interpolymerized 1-butene or 2-butene.

The polymers useful herein have molecular weights of at least about 100, preferably from about 250 and up to about 100,000. Still higher molecular weight polymers are useful and are often preferred because of their viscosity properties. Especially useful polymers are those having molecular weights ranging from about 700 to 5000, such as molecular weights of 600, 800, 1900, 3000, etc.

The halogenated olefin polymers are most conveniently prepared by treating a suitable olefin polymer with a halogenating agent such as chlorine, bromine, iodine, N-bromo-succinimide and N - chloro - phthalimide. The treatment can be carried out simply by contacting the olefin polymer with the halogenating agent at a temperature about 50° C., preferably from about 80° C. and up to about 120° C. or 250° C. or any temperature below the decomposition point of the reaction mixture. The relative amounts of the olefin polymer and a halogenating agent used in the treatment are such that at least about one atomic proportion of halogen is incorporated into the polymeric molecule. Such amounts, in most instances, are 1 mole of the olefin polymer and at least about 1 mole of the halogenating agent. Halogenated polymers useful herein may contain 2 or more, such as 10, atomic proportions of halogen in the polymeric molecule, especially in instances where the polymer is of relatively high molecular weight such as 1000 or higher. In some instances, the halogen content of such halogenated polymer is from about 0.1% to 15% by weight, preferably from about 2% to about 8%. To form such highly halogenated polymers, two or more moles of the halogenating agent are used for each mole of the olefin polymer to be halogenated.

For example, the chlorinated or brominated olefin polymers are formed by treating the polymer with chlorine or bromine at the desired temperature for a sufficient time to form a product of the desired chlorine or bromine content. The treatment may be carried out in the presence of a solvent such as carbon tetrachloride, chloroform, chlorobenzene, etc. It is accompanied by the formation of hydrogen chloride or hydrogen bromide which may simply be allowed to escape from the reaction mixture as the treatment proceeds. The precise chemical composition of the halogenated olefin polymer is not known. It is known, however, that such product may contain one or more chlorine or bromine substituents and is useful as a reactant in the above process for preparing the high molecular weight carboxylic compounds of the invention.

The method by which the halogen is incorporated into the olefin polymer is not critical. Hence any method available for halogenating olefin polymers may be used and products of such halogenation are contemplated for use as reactants in the above process.

The halogenated reactants useful to prepare the high molecular weight carboxylic compounds of the invention include also hydrocarbon halides which are characterized by the substantial absence of an alpha-hydrogen substituent, i.e. a hydrogen substituent attached to the carbon atom which is alpha, or adjacent, to the halogen-bearing carbon atom. Such hydrocarbon halides include, for example, 2,2,4,4-tetramethyl-3-pentyl chloride, 3,5-dimethyl-3,5-diethyl-4-hexyl chloride, 5-methyl-5-ethyl-7-butyl-7-propyl-6-undecyl bromide, 2,2,4,4-tetramethyl-3-heptadecyl chloride, 4,4-diethyl-6,6-dicyclohexyl-5-triacontanyl chloride, 9,9,11,11 - tetrapentyl - 10 - heptacontanyl chloride, or a like halide having a molecular weight of at least about 100 such as is indicated previously.

A particularly useful class of such hydrocarbon halides are the chlorinated polyisobutenes obtained by treating a polyisobutene with a halogenating agent such as chlorine, bromine, iodine, N-bromosuccinimide, N-chloro phthalimide or any other halogenating agent. Because of the particular structural composition of polyisobutene, its halogenated derivative is unique in that it is substantially free of an alpha-hydrogen substituent.

The alpha,beta-unsaturated monocarboxylic acid-producing compound useful in the present invention may be the acid, ester, amide, imide, ammonium salt, or halide. It preferably contains less than about 12 carbon atoms. Examples of such monocarboxylic acids include for example, acrylic acid, methacrylic acid (i.e., alpha-methylacrylic acid), crotonic acid, cinnamic acid, alpha-ethylacrylic acid, alpha-phenylacrylic acid, alpha-octylacrylic acid, beta-propylacrylic acid, beta-octylacrylic acid, beta-cyclohexylacrylic acid, alpha - cyclopentylacrylic acid, beta-decylacrylic acid, alpha-methyl-beta-pentylacrylic acid, alpha-propyl-beta-phenylacrylic acid, alpha-chloroacrylic acid, alpha-bromoacrylic acid, beta-chloroacrylic acid, alpha-chlorocrotonic acid, isocrotonic acid, alpha-methylcrotonic acid, alpha-methylisocrotonic acid, beta, beta-dichloroacrylic acid, etc. Esters of such acids, especially those in which the ester group is derived from a lower alkanol (i.e., having less than about 8 carbon atoms) likewise are useful in the invention. Specific examples of such esters include methyl acrylate, methyl methacrylate, ethyl acrylate, cyclohexyl acrylate, cyclopentyl methacrylate, neopentyl alpha - phenylacrylate, hexl alpha-propyl-beta-propylacrylate, octyl beta-decylacrylate and the like. Other esters such as those derived from other alcohols (e.g., decyl alcohol, epichlorohydrin, beta-chloroethanol, dodecyl alcohol, and 4-bromo-1-decanol) are also contemplated. Still other esters which are useful in the invention are exemplified by those derived from phenolic compounds including phenol, naphthol, cresol, o-butylphenol, m-heptylphenol, p-tertiary butylphenol, o,p-diisopropylphenol, alpha-decyl-beta-naphthol, p-dodecylphenol, and other alkyl phenols and alkyl naphthols in which the alkyl substituent preferably has less than about 12 carbon atoms.

The halides of the alpha,beta-unsaturated monocarboxylic acids are principally the chlorides and bromides. They are illustrated by acrylyl chloride, methacrylyl bromide, alpha-phenylacrylyl chloride, beta-decylacrylyl chloride as well as the chlorides and bromides of the above illustrated acids. The amides and the ammonia salts of alpha,beta-unsaturated monocarboxylic acids include principally those derived from ammonia or a monoamine such as an aliphatic amine or an aryl amine. Such amines may be mono-, di- or tri-alkyl or aryl amines such as methylamine, dimethylamine, trimethylamine, diethylamine, aniline, toluidine, decylamine, cyclohexylamine, dicyclohexylamine, triethylamine, melamine, piperazine, pyridine, N-methyloctylamine, N,N-diethylcyclohexylamine, o-butylaniline, p-decylaniline, etc. Again, the unsaturated acids from which the amides and ammonium salts of the above amines may be those illustrated previously. Imides of such acids derived from ammonia or a primary amine likewise are useful in the invention and the imides are formed by the replacement of 2 hydrogen atoms of ammonia or a primary amine with the carboxy radicals of the alpha,beta-unsaturated monocarboxylic acid. Likewise useful are the anhydrides of such monocarboxylic acids such as are formed by molecular dehydration of the acid. It should be noted that the above-noted acids and derivatives are capable of yielding the alpha,beta-unsaturated monocarboxylic acid and, for the sake of convenience, they are described by the generic expression "alpha,beta-unsaturated monocarboxylyic acid-producing compound."

The reaction of the halogenated hydrocarbon and the alpha,beta-unsaturated monocarboxylic acid-producing compound can be effected simply by mixing the reactants at a suitable temperature such as 80° C. or above. The preferred temperature for the reaction is within the range from about 120° C. to 250° C. A higher temperature such as 300° C. or 350° C. may be used provided it does not exceed the decomposition point of the reaction mixture. The reaction may be carried out in the presence of an inert solvent or diluent such as mineral oil, cyclohexane, naphtha, chlorobenzene, benzene or toluene. The use of such a solvent is often advantageous where one or both of the reactants are solids, semi-solids or viscous liquids. The reaction proceeds readily upon mixing the reactants at a suitable temperature. It ordinarily is facilitated by mild agitation and is completed within a short time. In most instances the reaction is complete in less than about 30 hours. Upon completion of the reaction, the reaction mixture may be blown with an inert gas such as nitrogen at an elevated temperature such as 100° C. or higher or under reduced pressure to remove any volatile components. The product so obtained is the desired high molecular weight carboxylic compound. It may be purified if desired by distillation, extraction, precipitation or any such well-known technique.

The reaction between the halogenated hydrocarbon and the alpha-beta-unsaturated monocarboxylic acid-producing compound usually calls for the use of at least about one chemical eqivalent of the acid-producing compound for each equivalent of the halogenated hydrocarbon. The equivalent weight of the acid is based on the number of carboxy radicals and that of the halogenated hydrocarbon is based on the number of halogen atoms in the molecule. For example, a mono-carboxylic acid, ester, or halide has one equivalent per mole. Similarly, the equivalent weight of a halogenated hydrocarbon can be determined from its halogen content.

More than 1 and up to about 5 equivalents of the acid-producing compound may be reacted with the halogenated hydrocarbon. An excess of either reactant may be used in the reaction and the excess of one reactant often facilitates the reaction and aids in the complete utilization of the other.

The precise mechanism of the reaction between the halogenated hydrocarbon and the alpha,beta-unsaturated monocarboxylic acid-producing compound is not known although it is known that the reaction involves the condensation of the olefinic linkage in the unsaturated acid with an activated group of the halogenated hydrocarbon. The activated group is directly associated with the presence of the halogen of the hydrocarbon reactant. It is further known that the structural composition of the halogenated hydrocarbon has a material influence. Thus, a halogenated hydrocarbon in which there is absent an alpha-hydrogen substituent in its molecular structure is especially desirable for use in the reaction with the unsaturated acid. Further, it is known that the product of the reaction is a high molecular weight carboxylic acid or an acid-producing derivative thereof in which the acid-producing group corresponds to that of the alpha,beta-unsaturated mono-carboxylic acid-producing compound from which the final product is derived.

An alternative process for carrying out the reaction of the present invention involves simultaneously forming the halogenated hydrocarbon and reacting the halogenated hydrocarbon and reacting the halogenated hydrocarbon with the alpha,beta-unsaturated monocarboxylic acid-producing compound. Such process is illustrated by preparing a mixture of the unsaturated acid-producing compound and the hydrocarbon reactant and contacting the mixture with a halogenating agent such as is illustrated previously. Such process is preferably carried out by preparing a mixture of the unsaturated acid-producing compound and the hydrocarbon at a relatively low temperature (e.g., 50°–100° C.) and then introducing the halogenating agent into the mixture as the temperature of the reaction mixture is allowed to increase to, e.g., 150° C., 250° C. or higher.

The following examples illustrate the process of the present invention.

EXAMPLE 1

A high molecular weight carboxylic acid is prepared by heating a chlorinated polyisobutene having a molecular weight of 350 and a chlorine content of 11.7% (7000 grams) and acrylic acid (1440 grams) at 180°–230° C. while hydrogen chloride is evolved from the reaction mixture. The reaction mixture is then heated at 210° C./12 mm. and filtered. The filtrate is the desired acid having a chlorine content of 0.35% and an acid number of 114.

EXAMPLE 2

A chlorinated polyisobutene having a molecular weight of 1000 and a chlorine content of 4.5% (6300 grams, 8 equivalents of chlorine) is mixed with acrylic acid (940 grams, 13 equivalents) and the mixture is heated to 235° C. while hydrogen chloride is evolved. It is then heated at 130°–182° C./6 mm. and then filtered. The filtrate is an acid having a chlorine content of 0.62% and an acid number of 63.

EXAMPLE 3

A chlorinated polyisobutene having a molecular weight of 1000 and a chlorine content of 4.3% (6550 grams, 8 equivalents) and acrylic acid (720 grams, 10 equivalents) are heated at 170°–220° C. for 17 hours and then at 180°/6 mm. The mixture is filtered and the filtrate is the desired acid having a chlorine content of 0.21% and an acid number of 56.

EXAMPLE 4

A polyisobutene having a molecular weight of 440 (3000 grams) is chlorinated at 95°–105° C. (by passing chlorine into the polyisobutene) until 242 grams of chlorine is incorporated into the polymer. The chlorinated polymer is blown with nitrogen at 100° C. and mixed with acrylic acid (613 grams, 8.4 equivalents). The mixture is heated at 165°–199° C. for 20 hours and then at 215° C./25 mm. to distill off volatile components. The residue is cooled to 160° C. and filtered. The filtrate is the desired acid having a chlorine content of 0.31% and an acid number of 82.

EXAMPLE 5

A mixture of acrylic acid (720 grams, 10 equivalents) and a chlorinated polyisobutene having a molecular weight of 1000 and a chlorine content of 4.3% (6536 grams, 8 equivalents of chlorine) is heated at 170°–225° C. for 12 hours and then at 200° C./10 mm. The residue is filtered at 140° C. and the filtrate is the desired acid having a chlorine content of 0.36% and an acid number of 60.

EXAMPLE 6

To 1000 parts (by weight) of the chlorinated polyisobutene of Example 2 there is added 109 parts of acrylic acid at 64° C. The mixture is heated to 187° C. in 4 hours and to the mixture there is added a solution of iodine (0.245 part) in 22 parts of carbon tetrachloride while the reaction mixture is heated to 224° C. The mixture is then heated at 202° C./7 mm. to distill off volatile components. The residue is the desired acid having a chlorine content of 0.25% and an acid number of 47.

EXAMPLE 7

The procedure of Example 2 is repeated except that the chlorinated polyisobutene is replaced on a chlorine equivalent basis with a chlorinated copolymer of isobutene (95% by weight) and styrene (5% by weight) having a molecular weight of 3000 and a chlorine content of 1.5%.

EXAMPLE 8

The procedure of Example 2 is repeated except that the chlorinated isobutene is replaced on a halogen equivalent basis with a brominated copolymer of isobutene (98% by weight) and isoprene (2% by weight) having a molecular weight of 5000 and a bromine content of 2.5 and that the acrylic acid used is replaced on a chemical equivalent basis with phenyl acrylate.

EXAMPLE 9

A mixture of octyl acrylate (1 equivalent) and a chlorinated polyethylene having a molecular weight of 1500 and a chlorine content of 0.5% (1 equivalent of chlorine) is heated at 150°–250° C. for 15 hours. The reaction mixture is then heated at 200° C./2 mm. and filtered. The filtrate is the desired acid.

EXAMPLE 10

A mixture of crotonic acid (2 equivalents) and a chlorinated polypropene having a molecular weight of 2500 and a chlorine content of 5% (0.5 equivalent of chlorine) is heated at 180°–220° C. for 5 hours and then at 200° C./1 mm. The residue is filtered and the filtrate is the desired acid.

EXAMPLE 11

The procedure of Example 2 is repeated except that the chlorinated polyisobutene used has a molecular weight of 60,000 and a chlorine content of 3%.

EXAMPLE 12

The procedure of Example 6 is repeated except that the chlorinated isobutene used is replaced on a halogen equivalent basis with a brominated polyisobutent having a molecular weight of 20,000 and a bromine content of 3% and that the acrylic acid used is replaced on a chemical equivalent basis with cinnamic acid.

EXAMPLE 13

A methyl ester of a high molecular weight mono-carboxylic acid is prepared by heating an equi-molar mixture of a chlorinated polyisobutene having a molecular weight of 1000 and a chlorine content of 4.7% by weight and methyl methacrylate at 140°–220° C.

EXAMPLE 14

A mixture of a chlorinated polyisobutene having a molecular weight of 350 and a chlorine content of 10.3% and acrylic acid (1 equivalent per equivalent of chlorine of the chlorinated polyisobutene) is heated at 150°–210° C. while hydrogen chloride is evolved from the reaction mixture. It is then heated at 170° C.–210° C./35 mm. and filtered. The filtrate is the desired acid having a chlorine content of 0.35% and an acid number of 116.

EXAMPLE 15

A high molecular weight acid is prepared by heating 3600 grams of a chlorinated polyisobutene having a molecular weight of 1000 and a chlorine content of 4.3% and 425 grams of acrylic acid at 147°–225° C. and then at 100° C./18 mm. and then filtering the reaction mixture. The acid has a chlorine content of 0.35% and an acid number of 56.

EXAMPLE 16

A mixture of acrylic acid (66 parts by weight) and the chlorinated polyisobutene of Example 2 (605 parts) is prepared at 55° C. The mixture is heated to 183° C. in 4 hours whereupon a solution of iodine (0.15 part) in carbon tetrachloride (13 parts) is added to the reaction mixture while the mixture is heated at 183°–224° C. for 12 hours. The mixture is then heated at 202°–208° C./10 mm. and then filtered. The filtrate is the desired acid having a chlorine content of 0.26% and an acid number of 56.

EXAMPLE 17

The procedure of Example 3 is repeated except that the acrylic acid is replaced on a chemical equivalent basis with butyl acrylate.

EXAMPLE 18

The procedure of Example 3 is repeated except that the acrylic acid is replaced on a chemical equivalent basis with propyl alpha-chloroacrylate.

EXAMPLE 19

The procedure of Example 3 is repeated except that the acrylic acid is replaced on a chemical equivalent basis with beta-ethyl acrylic acid.

EXAMPLE 20

The procedure of Example 3 is repeated except that the acrylic acid is replaced on a chemical equivalent basis with alpha-butyl acrylic acid.

EXAMPLE 21

The procedure of Example 3 is repeated except that the acrylic acid is replaced on a chemical equivalent basis with beta-octyl methacrylic acid.

EXAMPLE 22

A mixture of 400 grams of the chlorinated polyisobutene of Example 2, 47 grams of crotonic acid and 1 gram of xylene is heated at 165°–210° C. while hydrogen chloride is evolved from the reaction mixture. The mixture is then heated at 220° C./0.5–15 mm. The residue is the desired acid having a chlorine content of 0.09% and an acid number of 22.

EXAMPLE 23

A mixture of 400 grams of the chlorinated polyisobutene of Example 2, 81 grams of cinnamic acid, and 1 gram of xylene is heated at 150°–221° C. while hydrogen chloride is evolved from the reaction mixture. The mixture is then heated at 250° C./0.3 mm. The residue is the desired acid having a chlorine content of 0.11% and an acid number of 20.

EXAMPLE 24

A chlorinated polyisobutene having a molecular weight of 830 is treated with chlorine (1 part by weight per part of the polymer) at 120–125° C. for 3.5 hours. The resulting chlorinated polymer is then mixed with acrylic acid (1 mole per mole of the chlorinated polymer) and the mixture is heated at 150°–260° C. for 24 hours to form the desired acid.

The high molecular weight carboxylic compounds of this invention are useful for a variety of purposes. For example, they are useful as intermediates for the preparation of plasticizers, synthetic lubricating oils, stabilizers in polymeric compositions such as polyethylene, polypropylene and polyvinyl chloride, etc. They are further useful for the preparation of acylated amines which are effective as additives in lubricating compositions. In the latter use the high molecular weight carboxylic compounds can be reacted with an amino compound such as alkyl amines, hydroxy alkyl amines and alkylene amines. The alkylene amines conform for the most part to the formula

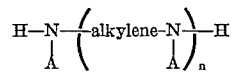

wherein $n$ is an integer preferably less than about 10, A is a substantially hydrocarbon or hydrogen radical, and the alkylene radical is preferably a lower alkylene radical having less than about 8 carbon atoms. The alkylene amines include principally methylene amines, ethylene amines, butylene amines, propylene amines, pentylene amines, hexylene amines, heptylene amines, octylene amines, other polymethylene amines, and also the cyclic and the higher homologs of such amines such as piperazines and amino-alkyl-substituted piperazines. They are exemplified specifically by: ethylene diamine, triethylene tetramine, propylene diamine, decamethylene diamine, octamethylene diamine, di(heptamethylene) triamine, tripropylene tetramine, tetraethylene pentamine, trimethylene diamine, pentaethylene hexamine, di(trimethylene) triamine, 2-heptyl 3-(2-aminopropyl) imidazoline, 4-methyl-imidazoline, 4-methyl-imidazoline, 1,3-bis-(2-aminoethyl) imidazoline, pyrimidine, 1-(2-amino propyl) piperazine, 1-4-bis(2-aminoethyl) piperazine, N,N-dimethylaminopropyl amine, N,N-dioctylethyl amine, N-octyl-N'-methylethylene diamine, and 2-methyl-1-(2-aminobutyl) piperazine. Higher homologs such as are obtained by condensing two or more of the above illustrated alkylene amines likewise are useful.

The ethylene amines are especially useful. They are described in some detail under the heading "Ethylene Amines" in "Encyclopedia of Chemical Technology," Kirk and Othmer, volume 5, pages 898–905, Interscience Publishers, New York (1950). Such compounds are prepared most conveniently by the reaction of an alkylene chloride with ammonia. The reaction results in the production of somewhat complex mixtures of alkylene amines, including cyclic condensation products such as piperazines. These mixtures find use in the process of this invention. On the other hand, quite satisfactory products may be obtained also by the use of pure alkylene amines. An especially useful alkylene amine for reasons of economy as well as effectiveness of the products derived therefrom is a mixture of ethylene amines prepared by the reaction of ethylene chloride and ammonia and having a composition which corresponds to that of tetraethylene pentamine.

Hydroxyalkyl-substituted alkylene amines, i.e., alkylene amines having one or more hydroxyalkyl substituents on the nitrogen atoms, likewise are contemplated for use herein. The hydroxyalkyl-substituted alkylene amines are preferably those in which the alkyl group is a lower alkyl group, i.e., having less than about 6 carbon atoms. Examples of such amines include N-(2-hydroxyethyl-)ethylene diamine, N,N'-Bis(2-hydroxyethyl)ethylene diamine, 1-(2-hydroxyethyl)piperazine, mono-hydroxypropyl-substituted diethylene triamine, 1,4-bis(2-hydroxypropyl)piperazine, dihydroxypropyl-substituted tetraethylene pentamine, N-(3-hydroxypropyl)tetramethylene diamine, and 2-heptadecyl-1-(2-hydroxyethyl) imidazoline.

Higher homologs such as are obtained by condensation of the above-illustrated alkylene amines or hydroxy alkyl-substituted alkylene amines through amino radicals or through hydroxy radicals are likewise useful. It will be appreciated that condensation through amino radicals results in a higher amine accompanied with removal of ammonia and that condensation through the hydroxy radicals results in products containing ether linkages accompanied with removal of water.

Other amines include primary, secondary and tertiary-amines such as mono-alkyl, di-alkyl, or tri-alkyl amines and also hydroxy-alkyl amines such as mono- and di-(hydroxyalkyl) amines. Examples of such amines include methylamine, dimethylamine, triethylamine, octylamine, N-octylmethylamine, N,N-dibutylamine, cyclohexylamine, N-methylcyclopentylamine, di-dodecylamine, ethanolamine, diethanolamine, dipropanolamine, etc. Such amines preferably contain up to about 30 carbon atoms in each alkyl group.

The reaction of the high molecular weight carboxylic compound and the amine is usually carried out by heating the two reactants at a temperature above about 80° C. preferably within the range of from about 100° C. to about 250° C. or from about 120°–180° C. or even a higher temperature provided that it does not exceed the decomposition point of the reaction mixture. When a high molecular weight carboxylic acid or anhydride is employed in the reaction the process may be carried out at a lower temperature such as room temperature to form products having predominantly salt linkages such as are characteristic of ammonium salts. Such products may be converted, if desired, by heating to about 80° C. to products having predominantly amide, imide, or amidine linkages. The use of a solvent such as benzene, toluene, naphtha, mineral oil, xylene, n-hexane or the like is often desirable in a reaction to facilitate the control of the reaction temperature.

As indicated previously, the product formed by the reaction of a high molecular weight carboxylic compound of this invention and an amine may be a salt, amide, imide, or amidine and in most instances it is a mixture of such compounds. To illustrate the reaction involving a carboxylic acid or anhydride with an alkylene amine at relatively low temperature results predominantly in a salt characterized by an ammonium carboxylate salt linkage

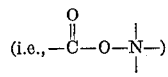

On the other hand the reaction at relatively high temperatures such as above about 80° C. results predominantly in an amide, imide, or amidine, characterized by linkages such as

or

For convenience, the product of such reaction is referred to as an acylated amine.

The relative proportions of the carboxylic compound and the amine are usually such that at least about one-half of a stoichiometrically equivalent amount of the amine reactant is used for each equivalent of the carboxylic acid compound. In this regard it will be noted that the equivalent weight of the amine is based upon the number of amino groups present in its molecular structure and the molecular weight of the carboxylic compound is based on the number of carboxylic radicals present in its molecular structure. For example, ethylene diamine has 2 equivalents per mole; tetraethylene pentamine has 5 equivalents per mole; high molecular weight monocarboxylic acid has 1 equivalent per mole; and a high molecular weight tricarboxylic acid has 3 equivalents per mole. The upper limit of the useful amount of the amine appears to be about 2 moles for each equivalent of the carboxylic compound. Such amount is required, for instance, in the formation of products having predominantly amidine linkages. A larger amount, such as 5 moles, of the amine may be used, but the excess amount of the amine appears not to take part in the reaction and thus simply remains in the product without any adverse effects. A lower limit of about one-half equivalent of the amine is based on the stoichiometry for the formation of products having predominantly imide linkages. In most instances the preferred amount of the amine is from about 0.75 to about 5 equivalents for each equivalent of the carboxylic compound.

The following examples illustrate the reaction of the carboxylic compound with an alkylene amine.

EXAMPLE 25

A mixture of 3605 grams (7 equivalents) of the high molecular weight carboxylic acid of Example 1, 287 grams (7 equivalents) of a commercial polyethylene polyamine having an average composition corresponding to that of tetraalkylene pentamine, and 2500 grams of mineral oil is prepared and heated to 200° C. while water is being distilled off. The reaction mixture is heated to 170° C./20 mm., washed with aqueous propanol and again heated to 150° C./20 mm. The residue is filtered and the filtrate is a 40% mineral oil solution of an acylated polyamine having a nitrogen content of 1.54%.

EXAMPLE 26

A mixture of 2377 grams of mineral oil, 3430 grams (4 equivalents) of the carboxylic acid of Example 2 and 165 grams (4 equivalents) of a commercial polyethylene polyamine having an average composition corresponding to that of tetraethylene pentamine is heated at 160°–200° C. for 5 hours while water is being distilled off. The mixture is then heated at 200°–245° C. for 5 more hours and filtered. The filtrate is a 40% mineral oil solution of an acylated polymaine having a nitrogen content of 0.92%.

EXAMPLE 27

To a mixture of 626 grams of mineral oil and 800 grams of the carboxylic compound of Example 3, there is added at 60°–80° C., 151 grams of tetraethylene pentamine throughout a period of 1 hour. The resulting mixture is heated to 150° C. and blown with nitrogen at 150°–160° C. for 8 hours and then filtered. The filtrate is a mineral oil solution of an acylated polyamine having a nitrogen content of 3.2%.

EXAMPLE 28

A mixture of 500 grams of xylene, 30 grams (1 equivalent) of ethylene diamine and 630 grams (1 equivalent) of the carboxylic compound of Example 4 is heated at 145° C. while water is being distilled off azeotropically. The reaction mixture is then heated to 150° C./15 mm. to remove volatile components, mixed with 525 grams of mineral oil and filtered. The filtrate is a mineral oil solution of an acylated amine having a nitrogen content of 1.08%.

EXAMPLE 29

Pentaethylene hexamine (189 grams, 4.5 equivalents) is added to a solution of the carboxylic compound of Example 5 (1400 grams, 1.5 equivalents) in mineral oil (1050 grams). The resulting mixture is heated to 190° C. and blown with nitrogen at 190°–210° C. for 2.5 hours. The residue is filtered and the filtrate is a mineral oil solution of an acylated hexamine having a nitrogen content of 2.4%.

EXAMPLE 30

To a mixture of 478 parts (by weight) of mineral oil and 650 parts of the carboxylic compound of Example 6, there is added at 60°–63° C., 62 parts (2.5 equivalents per equivalent of the carboxylic compound) of pentaethylene hexamine. The mixture is heated at 180°–215° C. and then filtered. The filtrate is a mineral oil solution of an acylated hexamine having a nitrogen content of 1.6%.

EXAMPLE 31

A mixture of N-aminoethyl piperazine (0.5 equivalent) and the carboxylic compound of Example 7 (1 equivalent) is heated in the presence of an equal amount of mineral oil at 150°–220° C. for 8 hours. The mixture is filtered and the filtrate is a mineral oil solution of the desired acylated amine.

EXAMPLE 32

A mixture of octylamine (2 equivalents) and the carboxylic compound of Example 8 (1 equivalent) is diluted with an equal volume of xylene and heated at the reflux temperature until no more water distills. The mixture is blended with an equal volume of mineral oil and heated at 150°–170° C./2 mm. to remove volatile components. The residue is filtered and the filtrate is the desired acylated octaylamine.

EXAMPLE 33

The procedure of Example 32 is repeated except that the octylamine is replaced on a nitrogen equivalent basis with pentaethylene hexamine and that the carboxylic compound used is that of Example 9 (1 equivalent).

EXAMPLE 34

The procedure of Example 32 is repeated except that the octylamine is replaced on a nitrogen equivalent basis with butylamine and that the carboxylic compound used is that of Example 10 (1 equivalent).

EXAMPLE 35

The procedure of Example 27 is repeated except that the carboxylic compound used is that of Example 11 (on a chemical equivalent basis).

EXAMPLE 36

A mixture of N-octadecyl trimethylene diamine (2 equivalents) and the carboxylic compound of Example 12 (1 equivalent) is heated in the presence of an equal weight of mineral oil at 180°–220° C., then at 180°–200° C./2 mm. and filtered. The filtrate is a mineral oil solution of the acylated trimethylene diamine.

EXAMPLE 37

The carboxylic compound of Example 13 is heated with a stoichiometrically equivalent amount of ethylene tetramine (i.e., 1 equivalent per equivalent of the carboxylic compound) at 100°–200° C. to produce an acylated amine.

EXAMPLE 38

A mixture of 375 grams of mineral oil, 515 grams (1 equivalent) of the carboxylic compound of Example 14 and 66 grams (1 equivalent) of an acrolein-ammonia molar ratio of 1:1) interpolymer having a nitrogen content of 23% by weight is heated at 150°–220° C. whereupon 16 grams of water is distilled off. The reaction mixture is washed with aqueous propanol, heated to 150° C./15 mm. and filtered. The filtrate is a mineral oil solution of acylated amine having a nitrogen content of 1.26%.

EXAMPLE 39

A mixture of 760 grams of mineral oil, 128 grams of N-aminoethyl pyrrolidone and 1007 grams of the carboxylic compound of Example 15 is heated at 200° C. whereupon water is distilled off from the reaction mixture. The residue is filtered and the filtrate is a 40% mineral oil solution of an acylated amine having a nitrogen content of 1.12%.

EXAMPLE 40

A mixture of 439 grams of ethanolamine and 2900 grams of the carboxylic compound of Example 16 is prepared at 100°–130° C. The mixture is then blown with nitrogen at 200° C. while water is being distilled off. The residue is mixed with 2190 grams of mineral oil and filtered. The filtrate is a mineral oil solution of an acylated amine.

EXAMPLE 41

A mixture of 1 equivalent of diethanol amine and 1 equivalent of the carboxylic compound of Example 17 is blended with an equal weight of mineral oil and the resulting mixture is heated at 150°–200° C. for 8 hours. The mixture is filtered and the filtrate is an oil solution of an acylated amine.

EXAMPLE 42

A mixture of 2 equivalents of cyclohexylamine and 1.5 equivalents of the carboxylic compound of Example 18 is diluted with an equal weight of xylene and the resulting mixture is heated at the reflux temperature until no more water distills. The residue is a xylene solution of an acylated amine.

EXAMPLE 43

A mixture of 1 equivalent of dimethylamine and 1 equivalent of the carboxylic compound of Example 19 is blended with an equal weight of mineral oil and the resulting mixture is heated at 180°–220° C. for 6 hours. The residue is a mineral oil solution of an acylated amine.

EXAMPLE 44

A mixture of 3 equivalents of melamine and 1 equivalent of the carboxylic compound of Example 20 is blended with an equal weight of mineral oil and the resulting mixture is heated at 150°–180° C. for 6 hours. The residue is filtered and the filtrate is an oil solution of an acylated amine.

EXAMPLE 45

A mixture of 1 equivalent of an N-hydroxyethyl-substituted tetraethylene pentamine and 1 equivalent of the carboxylic compound of Example 21 is diluted with an equal weight of mineral oil and the resulting solution is heated at 180°–250° C. for 6 hours. The residue is filtered and the filtrate is an acylated amine.

The acylated amines prepared by the process illustrated above are useful as additives in lubricating compositions, fuels such as gasoline, diesel fuels, or furnace fuels, cutting oils, metal working oils, plastics, paints, etc. For example, the product of Example 25 is useful in a No. 2 furnace diesel fuel (at a concentration of 0.05% by weight) and is effective to reduce the tendency of the fuel to cause clogging of filter screens. Those derived from a carboxylic compound having at least about 50 carbon atoms are especially effective as dispersant or detergent additives in lubricating compositions such as crankcase lubricating oils, lubricating greases, etc. When used in such lubricating compositions the acylated amine is usually present at a concentration ranging from about 0.1% to about 10% (by weight). The optimum amount for a particular application depends to a large measure on the type of service to which the lubricating composition is to be subjected. Thus, for example, lubricating compositions for use in gasoline internal combustion engines may contain from about 0.5% to about 5% of an acylated amine whereas lubricating compositions for use in gears and diesel engines may contain as much as 10% or even more of the additive.

The lubricating oils in which the acylated amines are useful may be of synthetic, animal, vegetable or mineral origin. Ordinarily mineral lubricating oils are preferred by reason of their availability, general excellence, and low cost. For certain applications oils belonging to one of the other three groups may be preferred. For instance, synthetic polyester oils such as didodecyl adipate or di-2-ethylhexyl sebacate are often preferred as jet engine lubricants. Normally the lubricating oils preferred will be fluid oils of lubricaitng viscosities ranging from about 40 Saybolt Universal Seconds at 100° F. to about 200 Saybolt Universal Seconds at 210° F. The source of the mineral oils is not critical. Thus, mineral oils of naphthenic base, paraffin base, or mixed base as well as oils derived from coal products are useful. Synthetic hydrocarbon oils such as polymers of propene or isobutene likewise are useful. Still other types of lubricating oils include for example, polymers of alkylene oxides (e.g., propylene oxide); oils obtained by the condensation of an alcohol or an alkylated phenol with one or more moles of an alkylene oxide, liquid esters of phosphorus acids; alkylated benzene or naphthalene; diarylethers (e.g., diphenyl ether, bis(heptylphenyl)ether); silicon polymers (e.g., polymeric alkyl siloxanes); etc .

This invention contemplates also the presence of other additives in the lubricating compositions. Such additives include, for example, detergents of the ash-containing type, viscosity index improving agents, pour point depressing agents, anti-foam agents, extreme pressure agents, rust-inhibiting agents, and oxidation and corrosion inhibiting agents.

The ash-containing detergents are exemplified by oil-soluble neutral and basic salts of alkali or alkaline earth metals with sulfonic acids, carboxylic acids, or organic phosphorus acids characterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium, and barium.

The term "basic salt" is used to designate the metal salts wherein the metal is present in stoichiometrically larger amounts than the organic acid radical. The commonly employed methods for preparing the basic salts involves heating a mineral oil solution of an acid with a stoichiometric excess of a metal neutralizing agent such as the metal oxide, hydroxide, carbonate, bicarbonate, or sulfide at a temperature above 50° C., and filtering the resulting mass. The use of a "promoter" in the neutralization step to aid the incorporation of a large excess of metal likewise is known. Examples of compounds useful as the promoter include phenolic substances such as phenol, naphthol, alkylphenol, thiophenol, sulfurized alkylphenol, and condensation products of formaldehyde with a phenolic substance; alcohols such as methanol, 2-propanol, octyl alcohol, Cellosolve, carbitol, ethylene glycol, stearyl alcohol, and cyclohexyl alcohol; amines such as aniline, phenylenediamine, phenothiazine, phenyl-beta-naphthylamine, and dodecylamine. A particularly effective method for preparing the basic salts comprises mixing an acid with an excess of a basic alkaline earth metal neutralizing agent, a phenolic promoter compound, and a small amount of water and carbonating the mixture at an elevated temperature such as 60°-200° C.

Extreme pressure agents and corrosion-inhibiting and oxidiation-inhibiting agents are exemplified by chlorinated aliphatic hydrocarbons such as chloronated wax; organic sulfides and polysulfides such as benzyl disulfide, bis-(chlorobenzyl) disulfide, dibutyl tetrasulfied, sulfurized sperm oil, sulfurized methyl ester of oleic acid, sulfurized alkylphenol, sulfurized dipentene, and sulfurized terpene, phosphosulfurized hydrocarbons such as the reaction product of a phosphorus sulfide with turpentine or methyl oleate; phosphorous esters including principally dihydrocarbon and trihydrocarbon phosphites such as dibutyl phosphite, diheptyl phosphite, dicyclohexyl phosphite, pentyl phenyl phospite, dipentyl phenyl phosphite, tridecyl phosphite, distearyl phosphite, dimethyl naphthyl phosphite, oleyl 4-phentylphenyl phosphite, polypropylene (molecular weight 500)-substituted phenyl phosphite, diisobutyl substituted phenyl phosphite; metal thiocarbamates such as zinc dioctyl-dithiocarbamate, and barium heptylphenyl dithiocarbamate: Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and zinc salt of a phosphorodithioic acid produced by the reaction of phosphorus pentasulfide with an equimolar mixture of isopropyl alcohol and n-hexyl alcohol.

The lubricating compositions may also contain metal detergent additives in amounts usually within the range of about 0.1% to about 20% by weight. In some applications such as in lubricating marine diesel engines the lubricating compositions may contain as much as 30% of a metal detergent additive. They may also contain extreme pressure addition agents, viscosity improving agents, and pour point depressing agents, each in amounts within the range of from about 0.1% to about 10%.

The effectiveness of the acylated amine as an additive in lubricating compositions is shown by the results of a Caterpillar Engine Test. In this test the lubricating composition is used in the crankcase of a 4-stroke diesel engine having a compression ratio of 15:1 operated for a specified period under the following conditions: speed, 1000 r.p.m.; B.t.u. input per minute 2900–3000; load, 20 brake horsepower; water jacket outlet temperature 175–180° F.; oil temperature, 140–150° F. A diesel fuel having a sulfur content of 1% is used. The lubrication composition is evaluated according to (1) the piston cleanliness (rating scale of 0–100, 100 being indicative of no deposit and 0 being indicative of heavy deposit) and (2) the amount of ring filling. By this test, an SAE 30 mineral lubricating composition containing 3.67% by weight of the porduct of Example 30 gives the following results: piston cleanliness rating, 98.5 and ring filling, <1% (test period of 120 hours); and piston cleanliness rating, 98.0 and ring filling, 1% (test period of 480 hours).

What is claimed is:

1. A process for preparing high molecular weight carboxylic compounds which comprises contacting and reacting a halogenated aliphatic hydrocarbon having a halogen content of from about 0.1% to about 15% and a molecular weight of from about 100 to about 100,000 with at least about one chemical equivalent, per equivalent of the halogenated aliphatic hydrocarbon, of an alpha, beta-unsaturated monocarboxylic acid-producing compound having up to about 12 carbon atoms and selected from the class consisting of acids, esters, amides, imides, ammonium salts, and halides, at a temperature of at least about 80° C. and up to about 350° C.

2. The process of claim 1 wherein the halogenated aliphatic hydrocarbon is a halogenated olefin polymer having a molecular weight within the range of from about 250 to about 100,000.

3. The process of claim 1 wherein the halogenated aliphatic hydrocarbon is a halogenated polymer of isobutene.

4. The process of claim 1 wherein the alpha,beta-unsaturated monocarboxylic acid-producing compound is acrylic or methacrylic acid or ester.

5. The process of claim 1 wherein the halogenated aliphatic hydrocarbon is a chloronated polybutyene having a molecular weight of from about 250 to about 100,000 and the alpha,beta-unsaturated monocarboxylic acid-producing compound is acrylic or methacrylic acid or an ester thereof with a lower alkanol.

6. A process for preparing high molecular weight carboxylic compounds which comprises contacting and reacting a chlorinated polybutene having a chlorine content of from about 0.1% to about 15% and a molecular weight of from about 700 to about 5000 with at least about one chemical equivalent, per equivalent of the chlorinated polybutene, of acrylic or methacrylic acid or an ester thereof with an alkanol having up to about 6 carbon atoms at a temperature of at least about 80° C. and up to about 350° C.

7. The process of claim 6 wherein the chlorinated polyisobutene has a chlorine content of from about 1 to 10 atomic proportions of chlorine per mole and a molecular weight of from about 700 to about 5000.

8. A process for preparing high molecular weight carboxylic compounds which comprises contacting and reacting an aliphatic hydrocarbon halide having a halogen content of from about 0.1% to about 15% and a molecular weight of from about 100 to about 100,000 and characterized by the absence of an alpha hydrogen substituent with at least about one chemical equivalent, per equivalent of the hydrocarbon halide, of an alpha,beta-unsaturated monocarboxylic acid-producing compound having up to about 12 carbon atoms and selected from the class consisting of acids, esters, amides, imides, ammonium salts, and halides, at a temperature of at least about 80° C. and up to about 350° C.

9. The process of claim 8 wherein the alpha,beta-unsaturated monocarboxylic acid-producing compound is acrylic or methacrylic acid or an ester thereof with a lower alkanol.

10. The product of the process of claim 1.
11. The product of the process of claim 7.
12. The product of the process of claim 8.

References Cited
UNITED STATES PATENTS

| | | | |
|---|---|---|---|
| 2,507,568 | 5/1950 | Hanford et al. | 260—408 |
| 3,341,542 | 9/1967 | Le Suer et al. | 260—268 |
| 3,374,174 | 3/1968 | Le Suer | 260—268 |
| 3,385,858 | 5/1968 | Katz | 260—268 |

ALEX MAZEL, *Primary Examiner.*

R. J. GALLAGHER, *Assistant Examiner.*

U.S. Cl. X.R.

208—15, 19; 252—51.5; 260—45.8, 45.85, 249.6, 268, 326.3, 404, 404.5